United States Patent Office 3,105,764
Patented Oct. 1, 1963

3,105,764
PROCESS OF MAKING NATURAL AGED CHEESE
Raymond G. Wagner, Rte. 1, Box 15, Weyauwega, Wis.
No Drawing. Filed May 19, 1961, Ser. No. 111,184
10 Claims. (Cl. 99—116)

This invention relates to a process for making cheese and more particularly to a process for making natural aged cheddar cheese having improved flavor and texture.

In the normal method of making cheddar cheese, a bacteria culture is added to raw, heat treated or pasteurized milk and after a ripening period during which the bacteria begins to develop, a small amount of rennet is mixed into the milk to form the cheese curds.

The bacteria culture commonly used in cheese making processes contains lactic acid producing bacteria and in addition, bacteria which are commonly called citric acid fermenters. According to the present invention, a small amount of citric acid or an inorganic salt of citric acid, such as sodium citrate, is added to the raw, heat treated or pasteurized milk along with the bacteria culture before the addition of the rennet. During the cheese making process and/or during the curing process, it is believed that the citric acid fermenters act upon the citrates in the milk to produce volatile acids which increase the flavor and aroma of the cheese.

In combination with the addition of citric acid, a vacuum treatment is employed during the aging process and serves to substantially shorten the aging period, as well as providing cheese with an improved body and texture. Generally, the aging treatment consists of aging the cheese for a period of about two months at a temperature of about 45° F. After this initial period of aging, the cheese is heated to a temperature of about 65° F. for a period to soften the curd and expand the gas within the cheese so it can be more readily expelled. The warming period also functions to accelerate the bacterial and enzyme action.

The cheese is then subjected to a controlled vacuum treatment designed to remove the gas from the cheese and seal the slits therein.

After this vacuum period, the pressure on the cheese is restored to atmospheric very quickly to prevent separation or opening of the sealed slits in the cheese.

The cheese is then returned to the aging chamber at about 45° F. and maintained at this temperature for the desired period of time to complete the aging process.

With the use of the citric acid addition to the raw, heat treated or pasteurized milk and by use of the vacuum process, the aging treatment can be substantially reduced for the cheddar cheese. It has been found that with the present invention, an aging period of about 6 months is comparable to an aging period of one year without the treatment.

In addition, the treatment accentuates the cheddar flavor and provides a desirable flavor blend in the cheese. The vacuum treatment improves the body of the cheese so that the cheese has no slit holes and the texture is also improved.

The citric acid is incorporated in the raw, heat treated or pasteurized milk or with the culture, or can be added to the mixture of the milk and culture before the addition of the rennet. The citric acid or other citric acid salt is employed in the range of 0.00005% to 0.20% by weight of the milk.

In place of citric acid, water soluble alkali metal salts of citric acid can be employed, such as sodium citrate and potassium citrate.

The bacteria culture to be employed in the process is a common type containing lactic acid producing bacteria and also containing citric acid fermenters. The citric acid fermenters, more specifically, are *Streptococcus citrovorous* and/or *Streptococcus paracitrovorous*. It is thought that the citric acid fermenters act upon the citric acid to form volatile acids which contribute greatly to the flavor and aroma of the cheese. In addition, other changes which have not been clearly identified are also believed to occur in the cheese.

The mixture of the milk, bacteria culture and the citric acid is processed by conventional cheese making methods. After the materials are mixed together in the vat, a ripening period is permitted during which the bacteria begins to develop. This ripening period may range from a few minutes to one hour, depending upon the quantity of the bacteria culture used and its activity. After the ripening period, a small amount of rennet, in an amount of about 3 ounces for each 1000 pounds of milk, is added to the mixture. The rennet, commonly diluted in 30 to 40 times its volume in water, is stirred into the milk and generally the agitators are made to travel the full length of the vat of milk two or three times. After this agitation, the stirring is stopped and the milk is permitted to remain undisturbed until coagulation has occurred.

After the cheese curd has formed, the curd is cut with wire knives to produce cubes of about ¼ inch in dimension. The curd is stirred gently for about 15 to 20 minutes to start the expulsion of whey and shrinkage of the curd. The curd and whey are then gradually heated to a temperature slightly above 100° F. and held at this temperature for 35 to 45 minutes. This heating period serves to firm the curd and expel the whey.

The mixture is then commonly stirred for an additional 35 to 40 minutes after the final cooking temperature has been reached. This serves to keep the curd free of lumps, increase the curd firmness and further expel the whey.

The whey is then drained from the curd and the curd is trenched and packed into banks. Subsequently, each bank of the trenched curd is cut into slabs about 6 to 8 inches wide which are turned top for bottom. After 10 minutes, the slabs are again turned top for bottom and the turning functions to expel the moisture from the curds and develop other desired curd characteristics.

The curd slabs are cut in two and piled two high with the slabs being reversed top for bottom. After 15 minutes the slabs are commonly piled 3 high and subsequently turned top for bottom and repiled 3 high. This exact amount of piling and repiling depends upon the nature of the curd and results desired. This piling procedure aids in removal of additional whey from the curds and serves to develop plasticity and lengthen the curd body. After this piling process, the curds are milled to a size of about 1 inch by 2 inches and usually rinsed with hot water at 130° F. to eliminate any free fat on the surface of the curds.

The curd is again trenched and drained of the rinsing water and subsequently salted at a rate of 3 to 3½ pounds of salt for each 1000 pounds of milk in the vat. The curd is forked in order to obtain uniform distribution and absorption of the salt and when the salt is quite well dissolved, the curd is again trenched and forked.

After this procedure the curd is transferred to hoops or forms and mechanically pressed into the hoops or forms. After pressing, the cheese in the hoops or forms is wrapped in either plastic foil or fabric wrappers to complete the cheese making process. This wrapping may be eliminated in the case of cheese curd packed in barrels or other large forms.

According to the invention, a vacuum treatment is employed during the aging of the cheese which substantially reduces the aging period and produces improved body and texture for the cheese. In the aging process the cheese is initially maintained at a temperature in the range of 32° F. to 55° F., preferably about 45° F., for a period of about one-half month to 5 months, with a period of 2 months being preferred.

After this initial aging period, the cheese is warmed to a temperature in the range of 55° F. to 70° F. and generally about 65° F. The cheese is maintained at this warm temperature for a period of at least four days and until the cheese is pliable and the gas production has substantially ceased. Generally this requires a period of 10 days to two weeks. The warming treatment serves to soften the curd and expand the gases so that they can be more readily expelled. In addition, the warmer temperature serves to accelerate the bacteria and enzyme action so that the bacteria has substantially "worked itself out" after the completion of the warming treatment.

The cheese is then transferred to a vacuum chamber and is generally at a temperature of 55° F. to 70° F. at this time. In the vacuum chamber, a vacuum is drawn on the cheese at a rate of less than 3 inches of mercury per minute until a vacuum of about 20 inches of mercury is obtained. Considering atmospheric pressure to be 29.92 inches of mercury at sea level, a vacuum of 20 inches of mercury would be equal to 7.92 inches of mercury absolute pressure or 3.87 p.s.i. If this vacuum is drawn on the cheese at too fast a rate, the voids in the outer portion of the cheese will be sealed so that the gas in the inner portion of the cheese will not be able to escape.

After this initial vacuum period, the vacuum is preferably increased to approximately 27 to 28½ inches of mercury (0.69 to 1.43 p.s.i.) for a period of at least 10 minutes with about 13 minutes being the usual procedure. This increased vacuum serves to accelerate the withdrawal of any gas remaining in the cheese.

On completion of the vacuum treatment, the air pressure on the cheese is restored to atmospheric at a very rapid rate so that the closed voids or slits in the cheese will not have the opportunity to expand. Generally, the pressure is brought up to atmospheric in a period of less than 10 seconds and generally in a period of two or three seconds.

The cheese is then returned to the aging chamber and aged at a temperature of 32° F. to 55° F. for an additional period of time which depends primarily upon the desired characteristics of the cheese, such as whether it is to be sharp or mild cheddar cheese.

The addition of the citric acid or other citric acid salt in combination with the vacuum treatment produces a cheese which has an improved flavor blend and the cheddar flavor is accentuated. The treatment substantially reduces the overall aging process and with this treatment, aging of six months provides a cheese having a flavor and texture comparable to that produced by aging for one year under conventional processes. The reduction in the aging process substantially reduces the overall cost of the cheese making process.

The treatment also serves to improve the body of the cheese and minimize the slits or voids in the cheese and also improves the texture.

*Example No. 1*

100 pounds of a starter bacteria culture containing lactic acid forming bacteria and citric acid fermenters were added to 10,000 pounds of milk at 87° F. in a vat. To this mixture 9 grams of sodium citrate were added and stirred into the mixture. The milk was then allowed to remain at this temperature for a period of about 60 minutes to permit the bacteria to begin developing.

40 ounces of rennet were then added to the milk in a ½ pail water solution and the rennet was stirred into the milk. After the stirring of the milk, it was allowed to come to rest for coagulation. After the curd formation, the curd was cut into particles having a size of about ¼ inch. The curd was then stirred for a period of about 15 minutes and subsequently the milk was heated to a temperature of 102° F. in 40 minutes and was held at this temperature with continuous stirring for a period of 30 minutes to firm the curd and expel the whey. After this heating period, the whey was drained from the curd.

After draining of the whey, a ditch was made down the center of the vat. Twenty minutes after the ditching or trenching, each bank of the curd was cut into slabs about 7 inches wide and the slabs were turned, rotating each top for bottom. The slabs were then turned a second time after 10 minutes.

The slabs were then cut in two and piled two high with the slabs being reversed after 10 minutes and repiled two high. After 15 minutes the curd blocks were piled three high, and repiled 15 minutes later. This piling treatment served to expel additional whey or moisture from the curds and lengthen the body of the curd. The curd blocks were then milled to chunks about 1 inch by 2 inches and subsequently rinsed with hot water at 130° F. to remove the free fat from the curds. The curds were again trenched and the water drained and subsequently 3 pounds of salt for each 1000 pounds of milk was added to the curds and sprinkled uniformly thereover in two additions, with stirring between additions. The curd was forked in order to obtain uniform distribution and absorption of the salt and when the salt was well distributed, the curd was again trenched and drained. After draining of the salty whey, the curd was reforked to break up the lumps and subsequently introduced into hoops having a diameter of 7 inches, and pressed into the hoops by a pneumatic press. Subsequently the hoops were covered with a plastic wrapping material.

The hoops of cheese, which weighed 75 pounds each, were then aged for two months at a temperature of 45° F. After this initial aging period, the cheese was heated to a temperature of 65° F. for 14 days. The cheese was then placed in a vacuum chamber while at a temperature of 65° F. and a vacuum of 21 inches of mercury was drawn in a period of 7 minutes. The vacuum was then increased to 28½ inches of mercury and held at this value for 13 minutes.

The vacuum was then released by opening two gate valves leading to the vacuum chamber so that atmospheric pressure was restored in 2½ seconds.

The hoop of cheese was then placed back in the refrigerating chamber at a temperature of 45° F. and aged for a period of 3 months. The resulting cheese had a firm texture and a sharp cheddar flavor.

Various modes of carrying out the invention are contemplated as being within the scope of the following claims particularly pointing out and distinctly claiming the subject matter which is regarded as the invention.

I claim:

1. A process for making a natural aged cheese, comprising admixing together raw milk, a bacteria culture and a material selected from the group consisting of citric acid and an alkali metal citrate with said material being added in an amount of 0.00005% to 0.20% by weight of the milk, adding a curd producing substance to the mixture to form curds and whey, separating the curds from the whey, pressing the curds into the desired form to provide a body of cheese, aging the cheese for a period of ½ month to 5 months at a temperature in the range of 32° F. to 55° F., subjecting the cheese to a temperature of 55° F. to 70° F. for a period longer than 4 days, subjecting the cheese to a vacuum in excess of 20 inches of mercury with the vacuum being applied at a rate slower than 3 inches of mercury per minute, and increasing the pressure on the cheese to atmospheric in a period less than 10 seconds, the addition of the said material and the vacuum treatment serving to shorten the aging time of the cheese and provide a cheese having improved flavor, body and texture.

2. In a process for making cheese, the steps comprising admixing together raw milk, a bacteria culture and a material selected from the group consisting of citric acid and alkali metal citrate with said material being added in an amount of 0.00005% to 0.20% by weight of the milk, adding a curd producing substance to the mixture to form curds and whey, separating the curds from the whey, pressing the curds into the desired form to provides a body of cheese, said material decomposing during the process to produce gaseous compounds which improve the flavor and aroma of the cheese and expand the voids in the cheese, subjecting the cheese to a vacuum for a period of time sufficient to withdraw the gaseous compounds from the voids and seal the same, and thereafter restoring the pressure on the cheese to atmospheric at a rate sufficiently fast to prevent expansion of the sealed voids.

3. In a process for making cheese, the steps comprising admixing with milk a bacteria culture containing lactic acid producing bacteria and citric acid fermenters and a material selected from the group consisting of citric acid and an alkali metal citrate with said material being added in an amount of 0.00005% to 0.20% by weight of the milk, adding a curd producing substance to the mixture to form curds and whey, separating the curds from the whey, pressing the curds into the desired form to provide a body of cheese, said citric acid fermenters reacting with said material during the process to produce gaseous compounds which improve the flavor and aroma of the cheese and expand the voids in the cheese, drawing a vacuum on the cheese in excess of 20 inches of mercury and at a rate sufficiently slow to prevent the voids in the outer portion of the cheese from sealing before the gas escapes from the voids in the inner portion of the cheese, maintaining the vacuum on the cheese for a period of time sufficient to withdraw the gaseous compounds from the voids and seal the same, and thereafter increasing the pressure on the cheese to atmospheric.

4. In a process of aging cheese, the steps of aging the cheese for a period up to five months at a temperature in the range of 32° F. to 55° F., heating the cheese to a temperature sufficient to soften the curd and expand the gases in the cheese, subjecting the cheese to a vacuum in excess of 20 inches of mercury at a rate sufficiently slow to prevent the voids in the outer portion of the cheese from sealing before the gas escapes from the voids in the inner portions of the cheese, and thereafter restoring atmospheric pressure on the cheese at a rate sufficiently fast to prevent expansion of the sealed voids and provide a body of cheese having improved body and texture.

5. In a process of aging cheese, the steps of aging the cheese for a period of ½ month to 5 months at a temperature in the range of 32° F. to 55° F., heating the cheese to a temperature in the range of 55° F. to 70° F. for a period of more than 4 days and until the gas formation has substantially ceased, reducing the pressure on the cheese to a value less than 3.87 p.s.i. at a rate slower than 1.47 p.s.i. per minute, and subsequently increasing the pressure on the cheese to atmospheric pressure in a period less than 10 seconds.

6. In a process of aging cheese, the steps of aging the cheese for a period of ½ month to 5 months at a temperature in the range of 32° F. to 55° F., heating the cheese to a temperature in the range of 55° F. to 70° F. for a period of more than 4 days and until the gas formation has substantially ceased, reducing the pressure on the cheese to a value less than 3.87 p.s.i. at a rate slower than 1.47 p.s.i. per minute, further reducing the pressure to a value of 0.69 p.s.i. to 1.43 p.s.i. and maintaining the cheese at this pressure for a period of more than 10 minutes, and increasing the pressure on the cheese to atmospheric in a period less than 10 seconds.

7. In a process of aging cheese, the steps of aging the cheese for a period of ½ month to 5 months at a temperature in the range of 32° F. to 55° F., heating the cheese to a temperature in the range of 55° F. to 70° F. for a period of more than 4 days and until the gas formation has substantially ceased, reducing the pressure on the cheese to a value less than 3.87 p.s.i. at a rate slower than 1.47 p.s.i. per minute, further reducing the pressure to a value of 0.69 p.s.i. to 1.43 p.s.i. and maintaining the cheese at this pressure for a period of more than 10 minutes, increasing the pressure on the cheese to atmospheric in a period of 2 to 3 seconds, and continuing aging the cheese at a temperature in the range of 32° F. to 55° F. for a period of time sufficient to develop the desired flavor and characteristics of the cheese.

8. A process for making a natural aged cheese, comprising admixing with raw milk and a bacteria culture a material selected from the group consisting of citric acid and an alkali metal citrate with said material being added in an amount of 0.00005% to 0.20% by weight of the milk, adding a small amount of rennet to the mixture to produce cheese curds and whey, separating the curds from the whey, pressing the curds into the desired form to provide a body of cheese, aging the cheese for a period of ½ month to 5 months at a temperature in the range of 32° F. to 55° F., heating the cheese to a temperature in the range of 55° F. to 70° F. for a period of more than 4 days and until the gas formation has substantially ceased, reducing the pressure on the cheese to a value less than 3.87 p.s.i. at a rate slower than 1.47 p.s.i. per minute, and subsequently increasing the pressure on the cheese to atmospheric pressure in a period less than 10 seconds.

9. A process for making a natural aged cheese, comprising admixing with raw milk and a bacteria culture from 0.00005% to 0.20% by weight of the milk of sodium citrate, adding a curd producing substance to the mixture to form curds and whey, separating the curds from the whey, pressing the curds into the desired form to provide a body of cheese, aging the cheese for a period of ½ month to 5 months at a temperature in the range of 32° F. to 55° F., heating the cheese to a temperature in the range of 55° F. to 70° F. for a period of more than 4 days and until the gas formation has substantially ceased, reducing the pressure on the cheese to a value less than 3.87 p.s.i. at a rate slower than 1.47 p.s.i. per minute, further reducing the pressure to a value of 0.69 p.s.i. to 1.43 p.s.i. and maintaining the cheese at this pressure for a period of more than 10 minutes, and increasing the pressure on the cheese to atmospheric in a period less than 10 seconds.

10. A process for making a natural aged cheese, comprising admixing with milk a bacteria culture containing citric acid fermenters and a material selected from the group consisting of citric acid and an alkali metal citrate with said material being added in an amount of 0.00005% to 0.20% by weight of the milk, said citric acid fermenters reacting with said material to produce volatile acids which improve the flavor and aroma of the cheese, adding a curd producing substance to the mixture to form curds and whey, separating the curds from the whey, pressing the curds into the desired form to provide a body of cheese, aging the cheese for a period of ½ month to 5 months at a temperature in the range of 32° F. to 55° F., subjecting the cheese to a temperature of 55° F. to 70° F. for a period longer than 4 days, subjecting the cheese to a vacuum in excess of 20 inches of mercury with the vacuum being applied at a rate slower than 3 inches of mercury per minute, increasing the pressure on the cheese to atmospheric in a period of 2 to 3 seconds, and thereafter aging the cheese at a temperature of 32° F. to 55° F. for a period determined by the flavor characteristics desired.

References Cited in the file of this patent

UNITED STATES PATENTS

| | | |
|---|---|---|
| 1,335,383 | McColl et al. | Mar. 30, 1920 |
| 1,897,892 | Draisback | Feb. 14, 1933 |
| 2,813,028 | Jackson | Nov. 12, 1957 |

OTHER REFERENCES

Fouts: Dairy Manufacturing Processes, John Wiley & Sons, Inc., New York, 1948, pp. 180–181. (Copy in Div. 63.)

Rogers: Fundamentals of Dairy Science, The Chemical Catalog Co., Inc., New York, 1928, pp. 21–22.